United States Patent [19]
Gall

[11] 3,833,061
[45] Sept. 3, 1974

[54] METHOD FOR SELECTIVELY REDUCING BRINE PERMEABILITY IN A SUBTERRANEAN OIL-WET FORMATION

[75] Inventor: James W. Gall, Bartlesville, Okla.

[73] Assignee: Phillips Petroleum Company, Bartlesville, Okla.

[22] Filed: Dec. 27, 1972

[21] Appl. No.: 318,848

[52] U.S. Cl. ............................... 166/294, 166/273
[51] Int. Cl. ............................................. E21b 33/13
[58] Field of Search ........... 166/270, 294, 295, 273

[56] References Cited
UNITED STATES PATENTS

| | | | |
|---|---|---|---|
| 2,614,635 | 10/1952 | Williams et al. | 166/294 |
| 2,800,184 | 7/1957 | Meadors | 166/294 |
| 3,003,555 | 10/1961 | Freeman et al. | 166/294 |
| 3,053,675 | 9/1962 | Rehmar et al. | 166/294 |
| 3,160,206 | 12/1964 | Jorda | 166/294 |
| 3,250,329 | 5/1966 | Prats | 166/294 |
| 3,306,356 | 2/1967 | Sparlin | 166/295 |
| 3,308,885 | 3/1967 | Sandiford | 166/295 |
| 3,596,469 | 8/1971 | Tazawa et al. | 61/36 R |
| 3,749,174 | 7/1973 | Friedman et al. | 166/294 |
| 3,757,863 | 9/1973 | Clampitt et al. | 166/270 |
| 3,762,476 | 10/1973 | Gall | 166/295 |

*Primary Examiner*—Stephen J. Novosad
*Assistant Examiner*—Jack E. Ebel

[57] ABSTRACT

A method for selectively reducing the permeability of an oil-wet subterranean formation penetrated by at least one well bore by passing an oxidizing agent through and in contact with the formation for oxidizing and removing hydrocarbon from the surfaces of the formation and thereafter contacting the treated formation surfaces with a crosslinked polymer for selectively reducing the permeability of the formation to brine while maintaining the permeability of the formation to hydrocarbon fluids relatively unchanged.

9 Claims, No Drawings

METHOD FOR SELECTIVELY REDUCING BRINE PERMEABILITY IN A SUBTERRANEAN OIL-WET FORMATION

In the art of removing hydrocarbon fluids from subterranean formation penetrated by a well bore, there is often encountered formations which are oil-wet and which contain large amounts of brine. In the production of these formations, the ratio of produced brine to hydrocarbon fluids often becomes sufficiently high to cause waste of labor, equipment, and time relative to formations which produce brine to a lesser extent.

It is, therefore, desirable to provide a method for selectively reducing the flow of brine through the formation while maintaining the flow of hydrocarbon fluids through the formation relatively unchanged.

This invention, therefore, resides in a method for selectively reducing the permeability of an oil-wet subterranean formation penetrated by at least one well bore by passing an oxidizing agent through and into contact with the formation for oxidizing and removing hydrocarbons from the surfaces of the formation and thereafter contacting the treated formation surfaces with a crosslinked polymer.

In the method of this invention, an oxidizing agent is passed downwardly through the well bore and outwardly through the oil-wet subterranean formation in contact with surfaces of the formation. The oxidizing agent oxidizes the hydrocarbon material positioned on the surfaces of the oil-wet formation and removes said hydrocarbon material from its locus. In addition, this oxidizing treatment causes the polarity of the surfaces to become more polar, thereby enhancing the attachment of subsequently injected polymers to said surfaces.

By increasing the strength of attachment of the polymer to the surfaces of the formation, the selective change in permeability will be maintained for larger periods of time, thereby reducing the waste of labor, equipment, and time responsive to retreatment to maintain the brine permeability of portions of the formation at a low level.

After the surfaces of the formation have been treated to a preselected radial distance from a well bore, the treated formation surfaces are contacted with a crosslinked polymer.

The polymer can be crosslinked in situ by passing the polymer, trivalent metal ions, and a complexing agent through the well bore and into contact with one another in the formation.

The polymer can be one of carboxymethylcellulose, polyacrylamides, polysaccharides, or mixtures thereof. The oxidizing agent can be one of $H_2O_2$, $Na_2O_2$, $NaOCl$, $KMnO_4$, $NaMnO_4$, $K_2Cr_2O_7$, $Na_2Cr_2O_7$, $(NH_4)_2Cr_2O_7$, $K_2CrO_4$, $Na_2CrO_4$, $(NH_4)_2CrO_4$, $CrO_3$, or $HNO_3$, for example.

The selective polymers can be cross linked by mixing the polymers with any multivalent metal ion and complexing agent such as, for example, citrates, acetates, and arsonates.

The polymers can be utilized in fresh water or brines with complexing ionic solutions having from about 10 ppm to about 10,000 ppm of the multivalent metal ions complexed with 10 to about 10,000 ppm complexing agent as set forth above.

These complexing ionic solutions can be injected after injection of the polymer, interspersed between a plurality of polymer slugs, or the polymer and the complexing ionic solution can be mixed at the surface and thereafter passed into the formation. For example, a first aqueous polymer solution can be injected into the formation followed by a complexing ionic solution of multivalent cations and retarding anions, followed by a brine having up to 200,000 ppm dissolved solids, followed by a second aqueous polymer solution. The retarding anions can be, for example, acetate, nitrolotriacetate, tartrate, citrate or phosphate in the range of about 10 to about 10,000 ppm.

In order to more thoroughly remove the hydrocarbon materials from the formation surfaces, a slug of brine can be passed through the formation in contact with the formation surfaces for washing the oxidizing agent-treated formation surfaces prior to contacting said surfaces with the crosslinked polymer as well as to bring pH of the formation back to what it was prior to the treatment.

An example of a formation treatment by the method of this invention is as follows:

Example Field Treatment:

Inject 500–7000 bbls. of sodium dichromate solution (500–5000 ppm) and shut the well in for 24 hours to permit sufficient oxidation. Treat the well with 2 slugs of about 1,000 bbl. each of 1500 ppm solution of partially hydrolyzed (10–40 per cent) polyacrylamide interspaced with a 500 bbl. slug of 4,300 ppm aluminum citrate solution. After a 2-day shut-in period, resume injection or production.

The length of well shut-in time is dependent upon many variables, such as formation thickness, porosity, and permeability. After these factors, among others, are determined, one skilled in the art can determine the well shut-in time for hydrocarbon oxidation. That shut-in time is preferably in the range of about 12 hours to 48 hours. At less time than about 12 hours, oxidation is generally not sufficiently complete in most formations and at periods greater than about 24 hours, there generally will be a waste of labor, equipment, and time.

Comparative oil and brine permeability tests utilizing the method of this invention are as follows:

A number of Burbank cones were treated with the following series of solutions:
1. Oxidant
2. Brine
3. Polyacrylamide
4. Aluminum citrate
5. Polyacrylamide The effect on the permeability to oil and brine is given in the table:

| Oxidant | RRF (Oil) | RRF (9% Brine) |
| --- | --- | --- |
| None | 1.5 | 2.5 |
| $H_2O_2$ | 1.9 | 114 |
| $KMnO_4$ | 3.4 | 30 |
| $Na_2Cr_2O_7$ | 2.7 | 132 |

The data show that pretreatment with the oxidant greatly increases the RRF to brine developed by the polymer-aluminum citrate system while not seriously affecting the RRF to oil.

RRF = Original Permeability to the Fluid/Final Permeability to the Fluid

A large RRF indicates a substantial decrease in the permeability to that fluid.

Other modifications and alterations of this invention will become apparent to those skilled in the art from the foregoing discussion and examples and it should be understood that this invention is not to be unduly limited thereto.

What is claimed is:

1. In a method for selectively reducing the permeability of an oil-wet subterranean formation to brine, said formation being penetrated by at least one well bore, which method comprises the steps of (b) injecting into said formation through said well bore a first aqueous polymer solution, (c) thereafter injecting into said formation through said well bore a complexing ionic solution of multivalent cations and retarding anions and capable of crosslinking said polymer, and (d) thereafter injecting into said formation through said well bore a second aqueous solution of a polymer capable of being crosslinked by said complexing ionic solution, the improvment comprising, in combination with said steps (b), (c), and (d), the step of:
   (a) passing an oxidizing agent downwardly through said well bore, and outwardly through and in contact with said formation for oxidizing and removing hydrocarbons from the surfaces of said formation prior to said step (b).

2. A method in accordance with claim 1 wherein a brine is injected into said formation through said well bore subsequent to said step (a) and prior to said step (b).

3. A method in accordance with claim 1 wherein said well is shut in for a period of time within the range of from 12 to 24 hours subsequent to said step (a) and prior to said step (b) to permit said oxidation of hydrocarbons.

4. A method according to claim 1 wherein said polymer in each of said steps (b) and (d) is selected from the group consisting of carboxymethyl cellulose, polysaccharides, polyacrylamides, and mixtures thereof.

5. A method according to claim 4 wherein:
   said oxidizing agent is selected from the group consisting of hydrogen peroxide, potassium permanganate, potassium dichromate, and sodium dichromate; and
   said retarding anions are selected from the group consisting of acetate, nitrolotriacetate, tartrate, citrate, and phosphate.

6. A method according to claim 5 wherein:
   said polymer in each of said steps (b) and (d) is a polyacrylamide;
   said oxidizing agent is a solution of sodium dichromate; and
   said complexing ionic solution comprises aluminum citrate.

7. A method according to claim 1 wherein:
   said well is shut in for a period of time within the range of from 12 to 24 hours subsequent to said step (a) and prior to said step (b) to permit said oxidation of hydrocarbon;
   a brine is injected into said formation through said well bore subsequent to said shut in period, and prior to said step (b);
   said polymer in each of said steps (b) and (d) is selected from the group consisting of carboxymethyl cellulose, polysaccharides, polyacrylamides, and mixtures thereof;
   said oxidizing agent is selected from the group consisting of hydrogen peroixde, potassium permanganate, potasium dichromate, and sodium dichromate; and
   said retarding anions are selected from the group consisting of acetate, nitrolotriacetate, tartrate, citrate, and phosphate.

8. A method according to claim 7 wherein:
   said oxidizing agent comprises an aqueous solution of sodium dichromate;
   said polymer in each of said steps (b) and (d) is a partially hydrolyzed polyacrylamide wherein the degree of hydrolysis is within the range of from 10 to 40 percent; and
   said complexing ionic solution comprises aluminum citrate.

9. A method according to claim 8 wherein:
   the concentration of sodium dichromate in said oxidizing agent solution is within the range of from 500 to 5,000 ppm by weight;
   the concentration of polymer in each of said polymer solutions is about 1,500 ppm by weight; and
   the concentration of aluminum citrate in said complexing ionic solution is about 4,300 ppm by weight.

* * * * *